Patented Aug. 19, 1952

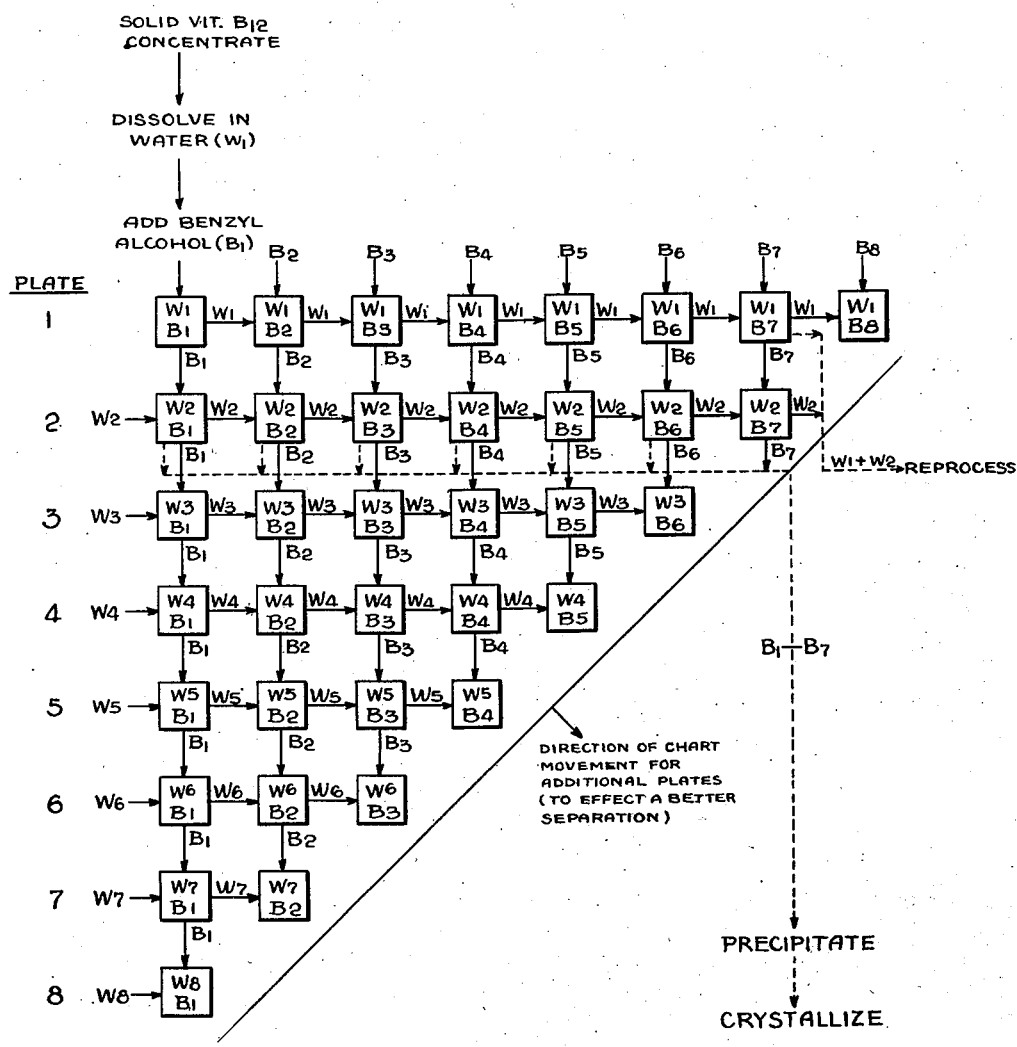

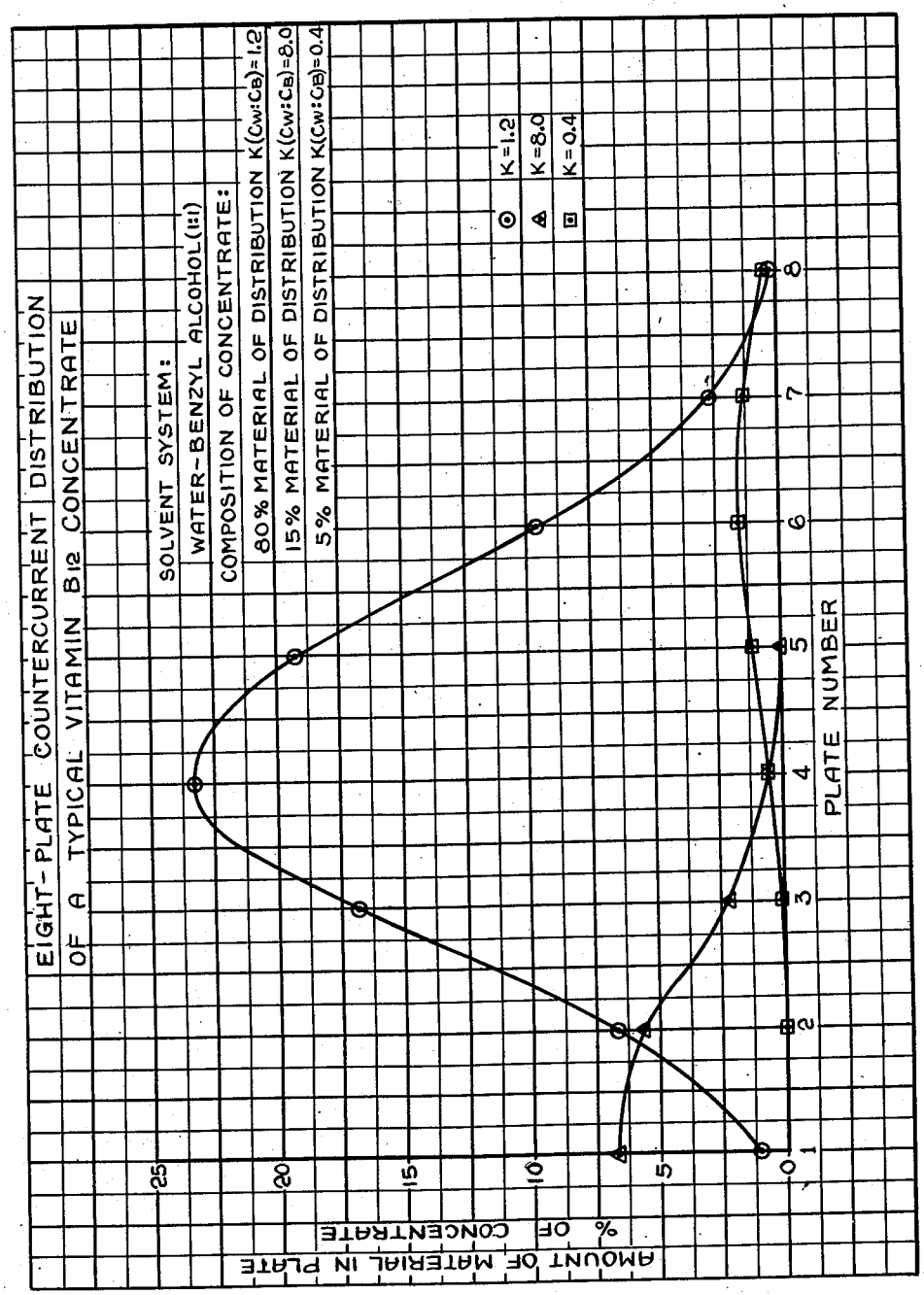

2,607,717

UNITED STATES PATENT OFFICE 2,607,717

BENZYL ALCOHOL-WATER COUNTERCURRENT DISTRIBUTION EXTRACTION OF VITAMIN $B_{12}$

Norman G. Brink, Plainfield, and Frank J. Wolf, Westfield, N. J., assignors to Merck & Co., Inc., Rahway, N. J., a corporation of New Jersey Application October 8, 1949, Serial No. 120,352

6 Claims. (Cl. 167—81)

This invention is concerned with a new and improved process which is especially useful in the recovery of vitamin-like materials from other chemical compounds with which they may be associated. More particularly, our invention is concerned with the recovery and separation of vitamin $B_{12}$ from a mixture of substances in which the vitamin $B_{12}$ is present along with other chemical compounds and substances, some of which associated substances are at present thought to be closely related to the vitamin, both in chemical constitution, and in physiological action.

Vitamin $B_{12}$ is a new vitamin of the B series whose isolation in crystalline form from liver was reported to the scientific world in a communication by Rickes, Brink, Koniuszy, Wood, and Folkers, published in Science on April 16, 1948, vol. 107, pages 396 and 397. The copending patent application of Rickes and Wood, Serial No. 20,356, filed April 10, 1948, now abandoned, is directed to this new vitamin and a method for its recovery from sources thereof.

Vitamin $B_{12}$ occurs in a number of source materials, as will be apparent from the report of the authors referred to above in Science for December 3, 1948, volume 108, pages 634 and 635. However, due to its low concentration in these materials, the separation and purification of vitamin $B_{12}$ has been found to be a very difficult problem. In certain fermentation broths, for example, vitamin $B_{12}$ occurs in quantities that apparently never exceed one part in ten million. Such extreme dilution has naturally made methods to isolate the vitamin, and to recover it in substantially pure form, very difficult to carry out on the industrial scale. It has, moreover, necessitated a whole series of purification steps, and a specialized technique which is difficult to carry out when treating large volumes of source material.

We have now found that vitamin $B_{12}$ can be readily separated from substances that accompany it in naturally-occurring media, which substances are apparently very closely related, both chemically and in physiological action, to vitamin $B_{12}$, by a process which involves countercurrent distribution of the vitamin $B_{12}$ between the various constituents of a partition solvent. Among suitable partition solvents we have found benzyl alcohol-water very satisfactory. Our improved process permits the ready recovery of vitamin $B_{12}$ in crystalline form with a minimum of operational steps, and at much less expense, than is required for its recovery by presently-available procedures.

Because of the very dilute concentration of vitamin $B_{12}$ in certain sources from which the vitamin is obtained, such as the various broths prepared by microbial fermentation, and because of its occurrence in those sources along with accompanying substances which are closely related to vitamin $B_{12}$, the isolation and recovery of the vitamin in crystalline form, and in a relatively high state of purity, has hitherto involved a great deal of difficulty. The methods now employed for recovering vitamin $B_{12}$ generally involve a series of purification steps, and they may include adsorption procedures, chromatography and fractional precipitation. Even with these highly specialized techniques, when operating on the commercial scale with considerable volumes of starting material, it has been observed that there is present along with the final product certain undesirable materials similar in constitution to vitamin $B_{12}$, which materials crystallize along with the vitamin in the final purification steps. In an effort to isolate and recover the vitamin $B_{12}$ from these materials in a high state of purity, it has been necessary to utilize a whole series of repeated crystallization steps, the product being crystallized and recrystallized from water, or from a mixture of water and an organic solvent. While such procedures have been successful to a limited extent in the recovery of vitamin $B_{12}$, and in its separation from these other materials with which it naturally occurs, these results have been secured only with the accompanying loss of a very considerable proportion of the vitamin $B_{12}$ present.

In addition to the inability of presently-available methods to recover all of the vitamin $B_{12}$ in the various source materials treated, these methods have also been subject to another great objection in that they cannot be relied upon to yield the desired vitamin, vitamin $B_{12}$, in substantially pure form. The methods now available, as a matter of fact, will only infrequently yield a product having a degree of purity in excess of 90%. As this is less than the minimum degree of purity required for vitamin $B_{12}$ which is intended for use in clinical studies by the medical profession as the pure vitamin, it is evident that there has been a wide field for improvement in presently-available industrial recovery procedures.

While the nature of the vitamin $B_{12}$-like materials which occur along with vitamin $B_{12}$ in source materials, and which makes separation of the pure vitamin difficult by means of the procedures now in use, has not been fully investigated, it appears that all of these materials are brilliantly red-colored compounds which contain the element cobalt. They appear to exhibit LLD, chick, and anti-pernicious anemia activities in varying degrees. However, these activities are considerably lower than those of pure vitamin $B_{12}$. Thus, from the chemical and biological point of view they appear to be closely related to the vitamin. However, in order to provide substantially pure vitamin $B_{12}$ which is available for the treatment of diseases such as pernicious anemia, it is essential that the vitamin $B_{12}$-like materials, present along with the vitamin $B_{12}$, be removed, and that the vitamin be supplied to the medical profession in substantially pure form, i. e., as a product of 95% purity or better.

Accordingly, it is the principal object of our invention to provide a method by which vitamin $B_{12}$ can be separated, in substantially pure form, e. g., as a product of 95% purity or higher, from other materials similar to vitamin $B_{12}$ in chemical and physiological activity with which the vitamin $B_{12}$ is associated in the usual source materials for the new vitamin.

It is another object of our invention to provide a new and improved separation step for effecting the isolation of vitamin $B_{12}$ in substantially pure form from fermentation media and other natural sources in which it is present, which method may be utilized either in conjunction with presently-available recovery methods, or independently of present methods, to recover the desired vitamin in the substantially pure crystalline form and substantially free of these naturally-occurring vitamin $B_{12}$-like contaminants.

It is still another object of our invention to provide a method for the recovery of vitamin $B_{12}$ from materials in which it may be present, which method permits the rapid and easy separation of vitamin $B_{12}$ from materials of a similar nature, and of similar physiological action, with which it may be associated, which method involves relatively inexpensive countercurrent distribution (partition) between two solvents of a two-phase partition solvent. In carrying out this object we preferably utilize, as the countercurrent distribution solvent, benzyl alcohol and water.

The foregoing objects of our invention, as well as other objects thereof of an auxiliary character, will be apparent from the ensuing disclosure of certain preferred embodiments of our improved recovery process. In the drawing, hereto annexed;

Fig. 1 is a flow sheet illustrating diagrammatically the process wherein an eight-plate countercurrent distribution is carried out; and Fig. 2 is a graph illustrating the results of the countercurrent distibution starting with a typical vitamin $B_{12}$ concentrate containing 80% of pure vitamin $B_{12}$ ($K=1.2$); 15% of an impurity of $K=8.0$; and 5% of an impurity of $K=0.4$. In this countercurrent distribution, the results of which are indicated graphically in Fig. 2, the system benzyl alcohol-water is utilized as the distribution solvent.

Throughout the specification and in the drawing, the number of transfers between the two solvent phases will be referred to either as a number of "plates" or as a number of "vessels." It will, of course, be apparent that the term "plate" refers to an equilibrium stage.

We have discovered that vitamin $B_{12}$ can be very efficiently and effectively separated from accompanying substances by utilizing for its recovery a countercurrent distribution procedure employing a suitable partition solvent. By utilizing such a procedure the undesired substances with which vitamin $B_{12}$ is associated in naturally-occurring sources and media remain in certain fractions of the countercurrent distribution liquid, while the vitamin $B_{12}$ content of the product undergoing treatment is withdrawn to and concentrated in a fraction of the partition solvent from which it may readily be recovered in substantially pure crystalline form.

While countercurrent distribution methods have previously been used under some circumstances, it is indeed surprising that simple countercurrent distribution can be utilized to bring about the ready separation of vitamin $B_{12}$ in a high state of purity from naturally-occurring materials which are of generally similar chemical construction and physiological activity. This is especially surprising when the extreme dilution in which the vitamin $B_{12}$ is present in the product undergoing treatment is considered.

We have found that the best solvent mixture to employ in the countercurrent distribution for the concentration and recovery of vitamin $B_{12}$ is a two-phase solvent mixture, preferably a mixture of benzyl alcohol and water, although it may be possible to substitute other solvents (such as cresol-toluene or cresol-carbon tetrachloride mixture) for benzyl alcohol. When this solvent mixture is employed as the partition liquid it has been found that the undesired substances forming the largest class of impurities, present along with the vitamin $B_{12}$, are distributed between the water and the benzyl alcohol in an apparent ratio of about 8 to 1, while the vitamin $B_{12}$ present in the mixture undergoing treatment, on the other hand, is distributed between the water and the benzyl alcohol in an apparent ratio of about 1.2 to 1. By thus separating off the benzyl alcohol phase of the two-phase solvent mixture it will be found that the vitamin $B_{12}$ substantially free from contaminants is present to the greatest extent in the benzyl alcohol phase, this phase containing only about one-ninth of the undesired substances of vitamin $B_{12}$-like character which were initially present along with the vitamin. The remaining eight-ninths of these contaminating substances originally present has been distributed to the water phase.

An additional class of impurities has also been found to be present in some instances. This class is of a low order of occurrence and appears to be distributed between water and benzyl alcohol in a ratio of about 0.4 to 1. In operating to obtain vitamin $B_{12}$ greater than 95% pure, it is often possible to ignore this second class of impurities.

In carrying an extended countercurrent distribution procedure employing a number of plates or vessels, as for example in the eight plate countercurrent distribution shown in Figure 1 of the drawing, the actual procedural step or mode of operation in accordance with the diagrammatic showing in the drawing are carried out as follows:

An initial vessel (or plate) is charged with a quantity of water $W1$ to which is added a quantity of benzyl alcohol $B1$. As indicated in the drawing, the vitamin $B_{12}$ concentrate is dissolved in the water and the benzyl alcohol is then added to the solution. The procedure, however, is precisely the same when the vitamin $B_{12}$ is introduced in the benzyl alcohol phase. In vessel No. 1 (which on a laboratory scale may be a separatory funnel), the mixture of W1 and B1 is thoroughly shaken and then allowed to separate into a water layer W1 and a benzyl alcohol layer B1. At this point, the vitamin $B_{12}$ and other materials introduced to the system together therewith will be distributed between the water and benzyl alcohol layers.

After stratification of the water and benzyl alcohol layers in plate or vessel No. 1, the benzyl alcohol layer B1 is drawn off and added to a quantity of fresh water W2 in a second plate or vessel No. 2 as indicated in the drawing. To the plate or vessel No. 1 containing the initial water layer W1 is added a fresh quantity of benzyl alcohol B2 as indicated in the drawing. The two plates or vessels now in the system are thoroughly shaken as above described causing a redistribution of the vitamin $B_{12}$ and associated materials in the liquid phases of the two plates or vessels. After this agitation, the benzyl alcohol layer B1 is withdrawn from vessel No. 2 and added to plate or vessel No. 3 containing a fresh quantity of water W3. The benzyl alcohol layer B2 in plate or vessel No. 1 is withdrawn and added to vessel No. 2 containing the water layer W2. To plate or vessel No. 1 containing the water layer W1 is added a fresh quantity of benzyl alcohol B3. The three plates or vessels now in the system, i. e., those identified in the drawing as containing water and benzyl alcohol layers W3/B1, W2/B2 and W1/B3 are again shaken and allowed to separate for redistribution of the vitamin $B_{12}$ and associated substances in the respective layers of each plate or vessel. The benzyl alcohol layer B1 from plate or vessel No. 3 is then withdrawn and added to plate or vessel No. 4 containing a fresh portion of water W4. The benzyl alcohol layer B2 is then transferred to vessel No. 3 containing water fraction W3, and the benzyl alcohol layer B3 in vessel No. 1 is transferred to vessel No. 2 containing water fraction W2, and a fresh quantity of benzyl alcohol B4 is added to vessel No. 1 containing water fraction W1.

After eight portions of water and benzyl alcohol have been added to the system, it will be evident that the eight plates or vessels contain water and benzyl alcohol layers W8/B1, W7/B2, W6/B3, W5/B4, etc., as indicated along the diagonal line in the drawing.

When multiple extractions as illustrated in the flow sheet constituting Fig. 1 of the drawing are carried out, this countercurrent distribution procedure is, in fact, so effective for the recovery of vitamin $B_{12}$ that it may be utilized in an assay procedure for determining the amount of the vitamin present in various broths obtained by microbial fermentation, and in various intermediate solids and solutions containing vitamin $B_{12}$ as secured. An assay procedure which may be utilized for the determination of vitamin $B_{12}$ is given in the copending application of F. J. Wolf, Serial No. 120,009, filed October 6, 1949, now Patent No. 2,530,416.

In carrying out countercurrent distribution utilizing a two-phase partition solvent such as benzyl alcohol and water, we have found that the process may be carried out on the industrial scale in a number of ways. For example, it is possible to utilize the following modified countercurrent distribution technique, this modified procedure being illustrated schematically in the annexed flow sheet constituting Fig. 1, of the drawing.

Water which has been saturated with benzyl alcohol is placed in two extraction vessels, and the solid material to be purified is dissolved in the first of the two vessels. To this first vessel there is then added a volume of benzyl alcohol which has been saturated with water, which volume is equal to that of the volume of the water saturated with benzyl alcohol originally introduced. The solvent mixture is then agitated in order to accelerate the distribution. The solvent mixture is then allowed to stand, the benzyl alcohol layer removed and separated, and this benzyl alcohol layer is then added to the second extraction vessel. Agitation of the solvent mixture in this vessel is then effected. At the termination of the agitation the solvent mixture is allowed to stand. The benzyl alcohol layer separates, and it is then removed and placed in a suitable storage vessel.

These countercurrent extraction steps are repeated a number of times, usually six or more times, utilizing each time fresh portions of benzyl alcohol. At the end of these operations, all of the benzyl alcohol layers obtained are combined. The benzyl alcohol solution resulting from the use of a total of seven portions of the alcohol contains about 94% of the vitamin $B_{12}$ originally present in the material treated and only about 20% of the undesired materials having an apparent distribution ratio of about 8 to 1, chemically and physiologically similar to vitamin $B_{12}$, which were present in the source material treated. The impurities having an apparent distribution ratio of about 0.4 to 1, when present will be found in the benzyl alcohol solution. This solution of vitamin $B_{12}$ in benzyl alcohol of greatly improved purity may be then treated in various ways to bring about the precipitation of the vitamin $B_{12}$ present therein. There is thus secured a crystalline product of very high purity, a product between 95% pure and 100% pure often being obtained.

By increasing the number of extraction vessels containing water saturated with benzyl alcohol which are employed in a series, it is possible to bring about the more complete separation of the major class of undesired substances from the vitamin $B_{12}$ recovered. In order to maintain a suitable high percentage of recovery of vitamin $B_{12}$ in the product being treated, it is generally preferable to increase the number of benzyl alcohol solvent portions employed in the countercurrent distribution, and this method is often highly advantageous in its operations, giving very satisfactory results, when the material treated is of a relatively low degree of purity insofar as its vitamin $B_{12}$ content is concerned.

Frequently, the impurities of distribution ratio 0.4 to 1 are found in undesirably high proportions, and we therefore prefer to use the following process which will nearly completely remove these impurities, thereby permitting the obtainment of vitamin $B_{12}$ which is nearly 100% pure. It is therefore preferred to ordinarily carry out a complete countercurrent distribution, as illustrated in the flow sheet constituting Fig. 1 of the drawing. The contents of the distribution vessels are then crystallized individually, and the crystals of the desired purity are segregated. The vitamin $B_{12}$ of highest purity will be obtained from the center vessels, while the impurities of distribution $K=8.0$ and $K=0.4$ will be found predominantly in the first several vessels and in the last several vessels, respectively. In this manner, substantially pure vitamin $B_{12}$ is separated from the two principle types of impurities.

In the foregoing illustrative examples we have specified that equivalent amounts of benzyl alcohol and water should be utilized, but it is also possible, of course, to vary the relative amounts of benzyl alcohol and water employed in the countercurrent distribution procedure. These proportions can be varied within considerable limits without interfering with the improved results attained. However, some variations in the distribution of vitamin $B_{12}$ and its accompanying contaminants over the extraction vessels may occur, and this may necessitate changes in the number of extraction vessels and in the number of water and benzyl alcohol portions employed for the countercurrent distribution.

Our process is particularly useful for the treatment of materials which are already high in vitamin $B_{12}$ content, such as, for example, source materials containing from 10% to 90% of vitamin $B_{12}$. However, the utility of our process is by no means confined to the treatment of materials of high vitamin $B_{12}$ content, as our improved procedure may be utilized to treat materials of widely different vitamin content. It may also be utilized for the purpose of removing other impurities from the vitamin $B_{12}$ concentrates at intermediate points in the processing of those concentrates for the purpose of recovering their vitamin $B_{12}$ content in the form of a substantially pure, crystalline product. For example fermentation broths as secured by the fermentation of various microorganisms including Streptomyces griseus may be treated by our improved method directly, and without any preliminary purification. However in most cases, it is ordinarily preferred to first subject fermentation broths as obtained by microbial fermentation to various other purification procedures in order to remove the bulk of impurities present therein, and to provide a material which is fairly high in vitamin $B_{12}$ concentration, which material can then be efficiently and effectively treated by our improved countercurrent distribution process in order to recover the vitamin $B_{12}$ therein in the substantially pure state and in crystalline form.

The following are illustrative examples of our new and improved recovery process for the recovery of vitamin $B_{12}$ in the substantially pure state from concentrates in which it may be present along with various contaminating materials.

Example 1

A fermentation broth resulting from the elaboration of S. griseus was treated with activated charcoal to adsorb the active factors. The charcoal was then eluted with aqueous pyridine to remove these factors, and the eluate was concentrated. The active factors were transferred to benzyl alcohol, and the resulting solution was chromatographed on activated alumina, the column being developed with methanol. The active factors were precipitated several times by adding acetone to a methanolic solution, a flocculent precipitate being thereby obtained. A representative precipitate weighed 40 grams and was found to contain about 2650 milligrams of vitamin $B_{12}$-like materials by measurement of the intensity of absorption at 5500 Å (a characteristic peak for vitamin $B_{12}$) and comparison with the known value for pure vitamin $B_{12}$.

The precipitate was dissolved in methanol and chromatographed on activated alumina, the column being developed with methanol. The red-colored rich effluent was found to contain 2280 milligrams of vitamin $B_{12}$-like materials by measurement of the intensity of the absorption at 5500 Å. The rich effluent was concentrated, and then precipitated with acetone-ether. The precipitate was dissolved in methanol, and ether was added in amount sufficient to effect precipitation. The precipitate, when dried, weighed 5.93 grams.

The precipitate was then dissolved in 100 milliliters of water saturated with benzyl alcohol, this operation being carried out in a centrifuge tube. In a second centrifuge tube there was placed 100 milliliters of water saturated with benzyl alcohol. 100 milliliters of benzyl alcohol saturated with water was then introduced into the first tube, and the tube was shaken well. The tube was centrifuged to effect separation of the water and benzyl alcohol layers. The benzyl alcohol layer was removed from the bottom of the tube, and then introduced into the second tube, where the shaking, centrifugation, and separation were repeated. The benzyl alcohol layer was stored separately in a collection vessel. Six additional 100 milliliter portions of benzyl alcohol saturated with water were passed through both tubes in the same manner, and the seven benzyl alcohol layers from the collection vessel were combined.

The combined benzyl alcohol layers were concentrated in vacuo at 35° C. to remove water, and 4.2 liters of ether and 1.4 liters of acetone were added to the cooled concentrate. A precipitate formed, and it was removed by filtration and dissolved in 400 milliliters of methanol. To this solution there was added 2 liters of ether, and a precipitate formed and was removed by filtration. This precipitate was dissolved in 21 milliliters of water and it was allowed to crystallize at 0–5° C., crystallization requiring a period of about 15 hours. The crystals that formed were removed by centrifugation, and they were then washed with water at 0–5° C. The crystals were redissolved in 100 milliliters of water, and the solution was then filtered through a sintered glass funnel. The apparatus was washed with 20 milliliters of water, and the wash water was combined with the filtrate. To this solution there was then added 1320 milliliters of acetone, and the resulting solution was allowed to stand for 1 hour at room temperature. An additional 240 milliliters of acetone was then added, and the solution was cooled at 0–5° C. for 3 hours. Crystals formed and they were removed by filtration and dried in vacuo at room temperature. There was thus obtained 910 milligrams of crystalline material. A sample dried to constant weight at 100° C. lost 6.7% of its weight, this being the amount of volatiles present. The dried sample was found to be 95.1% pure vitamin $B_{12}$ as verified by phase solubility analysis, and this is equivalent to 808 milligrams of pure vitamin $B_{12}$.

Example 2

Crystalline vitamin $B_{12}$, 4750 milligrams was obtained as described in Example 1. The material was assayed for vitamin $B_{12}$ content by the countercurrent distribution assay procedure described in the copending application of F. J. Wolf Serial No. 120,009, filed October 6, 1949, and was found to contain 4330 milligrams of the vitamin, equivalent to a purity of 91.3%. It was desired to further purify this material to raise the purity above 95%.

The 4750 milligrams of crystalline material was subjected to a complete 8-plate countercurrent distribution between 100 milliliter phases of water and benzyl alcohol, employing procedures as described in the foregoing specification and as illustrated in Fig. 1. At the completion of the distribution, there were eight vessels, numbered 1–8, that contained water and benzyl alcohol phases in equilibrium (eight portions of benzyl alcohol had contacted the water in vessel number 1, seven had contacted that of vessel number 2, etc.).

To each of the eight vessels was added 125 ml. of chloroform, to transfer the active materials to the water layer, and the water layers were separated. Each benzyl alcohol layer was washed with an additional 25 milliliters of water, and each wash was combined with the corresponding water layer. Each water phase thus obtained was assayed for total solids present and for maximum vitamin $B_{12}$ content, by measurement of the intensity of the absorption at 5500 Å. To each phase was then added 15 volumes of acetone, and crystals formed on standing. The crystals that formed in the solutions from vessels 3, 4, and 5 and 6 were removed by filtration and dried, and each set of crystals was assayed for vitamin $B_{12}$ content by the countercurrent distribution assay procedure. The results of the foregoing determinations are tabulated below:

| Vessel | Total Solids, mg. | Maximum Vitamin $B_{12}$ Present, mg. | Weight of Crystals, mg. (Anhyd.) | Purity of Crystals, Percent |
|---|---|---|---|---|
| 1 | 195 | 73 | | |
| 2 | 640 | 440 | | |
| 3 | 950 | 970 | 902 | 98 |
| 4 | 1,320 | 1,220 | 1,220 | 99.5 |
| 5 | 1,090 | 1,000 | 967 | 98 |
| 6 | 590 | 620 | 460 | 91 |
| 7 | 264 | 260 | | |
| 8 | 66 | 70 | | |

The crystals from vessels 3, 4, and 5 were of the desired high degree of purity. The materials from vessels 1 and 2, containing almost all of the undesired substances having an apparent distribution ratio of about 8:1 ($C_W:C_B$), and the materials from vessels 6, 7 and 8, containing almost all of the undesired substances having an apparent distribution ratio of about 0.4:1 ($C_W:C_B$), were combined with other like fractions for further purification by again subjecting them to countercurrent distribution.

The separation effected by the foregoing procedure is graphically illustrated in Fig. 2, wherein there are plotted the concentrations of the components of a typical vitamin $B_{12}$ concentrate for each plate after an eight-plate countercurrent distribution is carried out. The initial concentrate is, for purposes of illustration, assumed to contain 80% of pure vitamin $B_{12}$ ($K=1.2$), 15% of material of $K=8.0$, and 5% of material of $K=0.4$. It is apparent that the highest concentrations of vitamin $B_{12}$ are found in the center plates, which at the same time contain the lowest concentrations of the undesired impurities. Plate 4, for example, contains 24.17% of the weight of the starting concentrate; of this, 23.3% is vitamin $B_{12}$, 0.45% is material of $K=8.0$, and 0.42% is material of $K=0.4$. Thus, 96.5% of the substances present in solution in plate 4 is vitamin $B_{12}$. On crystallization from this plate in the manner described above, vitamin $B_{12}$ at least 96.5% pure is obtained, this crystallization often effecting some additional purification. On the other hand, it is apparent that the least vitamin $B_{12}$ and the most of the undesired materials are found in the first several and last several plates.

It will be understood that the proportions of interfering materials present will vary somewhat with the concentrate treated, and furthermore, that the apparent distribution coefficients for the principal classes of impurities are not absolute, but approximate, values. Thus, the amounts of impurities found in the center plates will often be less than shown in Fig. 2 and may, at times, be greater. In the latter event, repetition of the distribution process will provide vitamin $B_{12}$ of the desired purity. Alternatively, a more complete separation can be effected in one operation by increasing the number of plates employed. A graphic representation of this alternate procedure would show the curves for $K=8.0$ and $K=0.4$, as shown in Fig. 2, moving to the left and right, respectively, away from the peak of the curve for $K=1.2$.

While various changes and modifications may be made in our process as described herein with reference to certain preferred embodiments thereof, it is intended that such changes and modifications, to the extent that they are within the scope of the appended claims, shall be considered as part of our invention.

We claim:

1. The process for purifying vitamin $B_{12}$ that comprises equilibrating a starting mixture of vitamin $B_{12}$ and various contaminants in a two-phase solvent consisting of benzyl alcohol and water by agitating the resulting mixture and stratifying the solvent phases, thereby effecting a distribution of the vitamin $B_{12}$ and contaminants between the two phases, individually and successively contacting and equilibrating each of said phases with additional portions of the other phase in a countercurrent manner, thereby obtaining a number of portions of benzyl alcohol and portions of water each containing vitamin $B_{12}$ and contaminants in a vitamin $B_{12}$-contaminants ratio which is different from that prevailing in each other portion and in said starting mixture.

2. In a process for purifying vitamin $B_{12}$ the steps that comprise equilibrating a starting mixture of vitamin $B_{12}$ and various contaminants in a two-phase solvent consisting of benzyl alcohol and water in a suitable vessel by agitating the resulting mixture and then stratifying the solvent phases, thereby effecting a distribution of vitamin $B_{12}$ and the contaminants between the two phases, drawing off the lower benzyl alcohol layer from said vessel and adding the same to a second vessel containing a fresh portion of water while adding a fresh portion of benzyl alcohol to the water layer in said first vessel and equilibrating the mixtures thus obtained, then drawing the benzyl alcohol layer from the second vessel, advancing the benzyl alcohol layer from the first vessel to the second vessel and adding a fresh quantity of benzyl alcohol to the first vessel and again equilibrating the mixtures in said vessels, thereby obtaining a number of portions of benzyl alcohol and portions of water each containing vitamin $B_{12}$ and the contaminants in a vitamin $B_{12}$-contaminants ratio which is different from that prevailing in each other portion and in said starting mixture.

3. The process as defined in claim 2 wherein approximately equal volumes of water and benzyl alcohol are employed in each equilibration and wherein additional vessels containing fresh portions of water and additional portions of fresh benzyl alcohol are added to the system until there are in the system about 8 vessels having benzyl alcohol and water layers in equilibrium ranging from exhaustively extracted benzyl alcohol in contact with fresh water to exhaustively extracted water in contact with fresh benzyl alcohol, thereby effecting a concentration of vitamin $B_{12}$ in the intermediate vessels.

4. The process as defined in claim 2 wherein approximately equal volumes of water and benzyl alcohol are employed in each equilibration and wherein additional vessels containing fresh portions of water and additional portions of fresh benzyl alcohol are added to the system until there are in the system about 8 vessels having benzyl alcohol and water layers in equilibrium ranging from exhaustively extracted benzyl alcohol in contact with fresh water to exhaustively extracted water in contact with fresh benzyl alcohol, thereby effecting a concentration of vitamin $B_{12}$ in the intermediate vessels, and purified vitamin $B_{12}$ is recovered from the two-phase solvent mixture in said intermediate vessels by addition of chloroform to transfer all of the vitamin $B_{12}$ to the aqueous phase and crystallization of vitamin $B_{12}$ from the aqueous phase by addition of acetone.

5. The process as defined in claim 2 wherein two portions of water are contacted successively with 6 to 8 portions of benzyl alcohol and said portions of benzyl alcohol are combined for recovery of purified vitamin $B_{12}$ therefrom.

6. The process as defined in claim 2 wherein two portions of water are contacted successively with 6 to 8 portions of benzyl alcohol, said benzyl alcohol portions are combined and concentrated, and purified vitamin $B_{12}$ is precipitated therefrom by the addition of ether.

NORMAN G. BRINK.
FRANK J. WOLF.

REFERENCES CITED

The following references are of record in the file of this patent:

UNITED STATES PATENTS

| Number | Name | Date |
|---|---|---|
| 2,379,644 | Shelton | July 3, 1945 |

OTHER REFERENCES

Rickes, Science, Apr. 16, 1948, vol. 107, pages 396, 397.

Rickes, Science, Dec. 3, 1948, vol. 108, pages 634, 635.

Craig, Journal of Biological Chemistry, vol. 161 (1945), pages 321 to 332.

Ellis, J. Pharm. and Pharmacol., vol. 1, pages 60, 61 (1949).